United States Patent [19]

Nomoto et al.

[11] 4,235,852

[45] Nov. 25, 1980

[54] PROCESS FOR TREATING AN EXHAUST GAS CONTAINING NITROGEN OXIDES AND SULFUR OXIDES

[75] Inventors: Kohki Nomoto; Yoshihiko Kudo, both of Iwaki, Japan

[73] Assignee: Kureha Kagaku Kogyo KabushikiKaisha, Tokyo, Japan

[21] Appl. No.: 49,891

[22] Filed: Jun. 19, 1979

[30] Foreign Application Priority Data

Jun. 28, 1978 [JP] Japan .................................. 53-78340

[51] Int. Cl.³ .......................... C01B 17/04; C01C 1/10
[52] U.S. Cl. .................................... 423/235; 423/242; 423/431; 423/567 A
[58] Field of Search .................... 423/235, 242 A, 431, 423/561, 567

[56] References Cited

U.S. PATENT DOCUMENTS

| | | | |
|---|---|---|---|
| 3,932,587 | 1/1976 | Grantham et al. | 423/242 |
| 3,991,161 | 11/1976 | Saitoh et al. | 423/235 |
| 4,141,961 | 2/1979 | Miller | 423/242 X |

FOREIGN PATENT DOCUMENTS 2833440 2/1979 Fed. Rep. of Germany .

*Primary Examiner*—G. O. Peters
*Attorney, Agent, or Firm*—Stevens, Davis, Miller & Mosher

[57] ABSTRACT

A process is described for treating an exhaust gas containing $NO_x$ and $SO_x$ in which $NO_x$ and $SO_x$ are effectively converted into industrially useful products of $NH_3$, or sulfur by use of an aqueous absorbing solution containing at least iron chelate salt and potassium sulfite.

3 Claims, 1 Drawing Figure

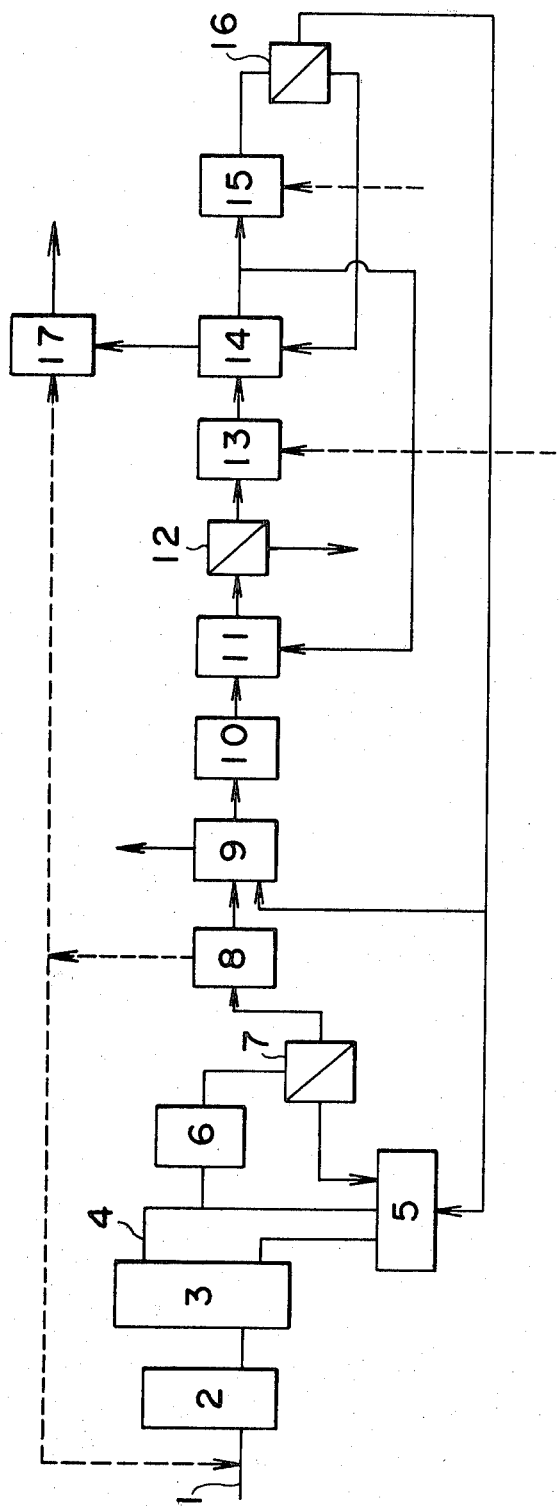

PROCESS FOR TREATING AN EXHAUST GAS CONTAINING NITROGEN OXIDES AND SULFUR OXIDES

This invention relates to a process for treating an exhaust gas containing nitrogen oxides, hereinafter referred to as $NO_x$, and sulfur oxides, hereinafter referred to as $SO_x$, an more precisely relates to the process in which $NO_x$ and $SO_x$ are effectively converted into industrially useful products of $NH_3$, $H_2S$ or sulfur by use of an aqueous absorption solution containing at least iron chelate salt and potassium sulfite.

As method for simultaneously absorbing and removing $NO_x$ and $SO_x$ contained in the exhaust gases, there has been known so far a process for absorbing them in an aqueous solution containing a ferrous chelate salt and an alkali sulfite to fix them in the form of imidodisulfonate, as disclosed in U.S. Pat. Nos. 3,991,161 and 3,992,508. Isolation of the imidodisulfonate thus obtained in a useful form is, however, difficult as well as disadvantageous in view of cost. It is thus desired to convert them into useful ammonia or ammonium sulfate, or into gaseous nitrogen.

In view of the above, a process is proposed, for example as in Japanese Patent Laid Open No. 108682/76, which hydrolyzes under an acidic condition of sulfuric acid an imidodisulfonate produced in the absorption solution into sulfamic acid without separating it from the absorption solution and further carries out the reaction of the sulfamic acid with nitrous acid to form nitrogen. However, hydrolysis of the imidodisulfonate at a low concentration in the absorption solution as it is without separation requires a great amount of sulfuric acid and is also disadvantageous in view of heat economy. In addition, simultaneous decomposition of a dithionate produced as by-products upon absorption requires more severe hydrolyzing conditions.

As another method, Japanese Patent Laid Open No. 125670/76 also describes a process for oxidizing a part of an alkali sulfite in the solution into an alkali sulfate, then converting the alkali sulfate into gypsum, separating the gypsum and then after the separation of imidodisulfonate from the residual filtrate converting the imidodisulfonate into ammonium sulfate through hydrolysis. However, in the process including the step of alkali sulfate-gypsum conversion the gypsum is present in the state of dissolution in the recycling solution, which is apt to precipitate as calcium sulfite scales if the alkali sulfite concentration in the solution is increased. The alkali sulfite concentration can not thus be increased and, accordingly, a ferric salt produced through oxidation upon absorption can not be reduced into a ferrous salt at a sufficient rate industrially. Then, in this case is required an additional means in which the ferric salt is reduced into the ferrous salt with use of a sulfide or the like.

The object of the present invention is to propose a process for effective treatment of the exhaust gas containing $NO_x$ and $SO_x$ in which a potassium sulfite used as an alkali sulfite in the absorption solution is present at a high concentration, the absorption products are crystallized to separate as potassium salts of lower solubility while reducing, at a sufficient rate, a ferric salt produced through oxidation upon absorption into a ferrous salt and, thereafter, nitrogen oxides, $NO_x$, are converted into gaseous ammonia and sulfur oxides, $SO_x$, are converted into hydrogen sulfide or sulfur.

Accordingly, the present invention provides a process for treating an exhaust gas containing nitrogen oxides and sulfur oxides comprising: contacting the gas with an aqueous absorption solution containing at least iron chelate salt and potassium sulfite to absorb the nitrogen oxides and the sulfur oxides into the aqueous solution; cooling the absorption solution containing absorption products of potassium imidodisulfonate, potassium dithionate and potassium sulfate to precipitate and separate the absorption products; heating the precipitate in the presence of steam to 200° to 400° C. to hydrolyze the potassium imidodisulfonate into ammonium hydrogen sulfate and potassium sulfate and at the same time to thermally decompose the potassium dithionate into potassium sulfate and sulfur dioxide gas; then adding an alkali for neutralization at a high temperature of 150° to 400° C. to generate and recover ammonia; reducing the residual potassium sulfate into potassium sulfide; and converting the potassium sulfide in an aqueous solution into hydrogen sulfide and potassium hydrogen carbonate by use of gaseous carbon dioxide.

Hereinafter, the invention is described by the accompanying drawing.

The FIGURE represents one of the process charts for carrying out this invention.

An exhaust gas 1 at a high temperature containing $NO_x$ and $SO_x$ is desirably cooled in a cooling tower 2 below 100° C., preferably below 80° C., so that the temperature of an absorption solution contacted in an absorption tower 3 may not exceed 70° C. This is desired since the chelating agent of an iron chelate salt in the absorption solution tends to decompose easily if the temperature of the absorption solution exceeds 70° C., and it is particularly desired to lower the temperature of the absorption solution below 60° C. in the use of ethylene diaminetetraacetate as the chelating agent. It is also desired to remove dusts, hydrogen chloride and the like contained in the exhaust gas in the cooling tower 2.

The exhaust gas 1, after cooling, is introduced in absorption tower 3 and contacted with the absorption solution led from a pipe 4 to absorb $NO_x$ and $SO_x$ thereinto. The absorption solution from the pipe 4 is an aqueous solution containing 0.1 to 0.5 mol/kg, preferably 0.2 to 0.4 mol/kg of an iron chelate salt and 0.4 to 2.5 mol/kg, preferably 0.8 to 1.6 mol/kg of potassium sulfite ($K_2SO_3$) and potassium hydrogen sulfite ($KHSO_3$). Preferred chelating agents used herein include aminopolycarboxylates such as ethlenediaminetetraacetate, nitrilotriacetate or the like.

While the solution absorbing therein $NO_x$ and $SO_x$ is recycled through a recycle tank 5 again into the absorption tower 3, a part of which is branched and cooled to 10° to 35° C., preferably 30° to 35° C., in a crystallizer 6 in which potassium imidodisulfonate, potassium dithionate and potassium sulfate contained in the solution as absorption products are crystallized, and then separated in a separator 7 and the filtrate is returned to the recycle tank 5. The separated crystal mixture is heated in the presence of steam to 200° to 400° C., desirably 250° to 300° C., to hydrolize the imidodisulfonate into ammonium hydrogen sulfate ($NH_4HSO_4$) and potassium sulfate ($K_2SO_4$) as shown by the following formula (1):

$$NH(SO_3K)_2 + 2H_2O \rightarrow NH_4HSO_4 + K_2SO_4 \qquad (1)$$

In the mean time, $K_2S_2O_6$ is also thermally decomposed as shown by the folloring formula (2):

$$K_2S_2O_6 \rightarrow K_2SO_4 + SO_2 \quad (2)$$

The gaseous $SO_2$ produced in the formula (2) is at least partially mixed with the exhaust gas and returned to the absorption tower.

In the above hydrolysis, while the imidodisulfonate may be hydrolyzed by heating in an aqueous solution or slurry, for the subsequent step of converting $K_2SO_4$ into potassium sulfide ($K_2S$), it is desired to hydrolyze it without converting into the aqueous solution. While hydrolysis in the presence of steam occurs above 100° C. and the reaction rate is increased as the temperature goes higher, thermally decomposing reaction also occurs above 400° C. together with the hydrolysis to decrease the recovery rate for ammonia in the subsequent step. Preferred reaction temperature is, therefore, between 250° to 300° C.

The thermally decomposing reaction is shown by the following formula (3):

$$NH(SO_3K)_2 \rightarrow K_2SO_4 + SO_2 + \tfrac{1}{2}N_2 + \tfrac{1}{2}NH_3 \quad (3)$$

The crystal mixture resulting after the completion of the hydrolysis of potassium imidodisulfonate and the thermal decomposition of $K_2S_2O_6$ is then neutralized with an addition of alkali such as potassium carbonate ($K_2CO_3$), potassium hydrogen carbonate ($KHCO_3$) or the like at a high temperature of 150° to 400° C., preferably 200° to 300° C. to generate and recover ammonia in an ammonia generator 9. While gaseous $CO_2$ is also produced as by-products during the addition of the alkali and admixed into the ammonia gas, it results in no troubles for ordinary use of $NH_3$ gas. Reaction residues are substantially composed of $K_2SO_4$ and contain a little amount of unreacted $K_2CO_3$.

$$NH_4HSO_4 + 2KHCO_3 \rightarrow K_2SO_4 + 2CO_2 + 2H_2O + NH_3 \quad (4)$$

$$NH_4HSO_4 + K_2CO_3 \rightarrow K_2SO_4 + CO_2 + H_2O + NH_3 \quad (5)$$

$K_2SO_4$ formed in the above reaction (1), (2), (4) and (5) is subsequently reduced into $K_2S$ in a reducing reaction furnace 10. A part of $K_2S$ thus obtained may be further converted into $K_2CO_3$.

$$K_2SO_4 + 4C \rightarrow K_2S + 4CO \quad (6)$$

$$K_2SO_4 + 2C \rightarrow K_2S + 2CO_2 \quad (7)$$

$$K_2S + CO_2 + H_2O \rightarrow K_2CO_3 + H_2S \quad (8)$$

The reducing reaction may be conducted by previously incorporating carbon as a reducing agent, for example, coal, cokes, petroleum pitch, petroleum cokes or the like. In the use of coal as the reducing agent, $K_2SO_4$ is mainly converted into $K_2S$ and $K_2CO_3$ results in about 10 mol% at a temperature 900°–1000° C. The ratio of $K_2CO_3$ can be increased to about 40 mol% at a reaction temperature of 800°–900° C. The ratio of $K_2CO_3$ can further be increased in the use of a reducing gas such as CO, $H_2$ or the like. The off-gas discharged from the reducing furnace 10 is returned to the cooling tower 2 after combustion.

$K_2S$ and $K_2CO_3$ formed in the reducing reaction are dissolved in water or a solution discharged from a below-mentioned $H_2S$ release tower 14 in a dissolution tank 11, thereby to make an aqueous solution, and there are removed insoluble products derived from the reducing agent in a separator 12.

Thereafter, $K_2S$ is converted into $H_2S$ and $KHCO_3$ using $CO_2$ gas. While $H_2S$ can be obtained by directly introducing $CO_2$ gas to the $K_2S$ solution, $H_2S$ concentration obtained in such a way is 10–30% by volume and the remaining portion is $CO_2$ gas. Consequently, this is not desired industrially since it requires a great amount of $CO_2$ gas. Combustion exhaust gas may be used and can ensure to provide a sufficient amount of the gas but it further lowers the concentration of $H_2S$ and brings $O_2$ into $H_2S$ gas. Thus, the combustion exhaust gas is not applicable to production of sulfur through Claus reaction.

For obtaining $H_2S$ gas at a high concentration without containing $O_2$, the following procedures may be taken.

A partial absorption of $CO_2$ gas into the $K_2S$ solution is at first conducted in a preliminary $CO_2$ absorption tower 13 until $K_2S$ is substantially converted to KHS without generation of gaseous $H_2S$. The combustion exhaust gas with $SO_x$ gas removed can be employed as the $CO_2$ gas source, but it may partially be replaced with the below-mentioned off-gas from a $CO_2$ absorption tank 15.

Absorbing reaction formula:

$$K_2S + CO_2 + H_2O \rightarrow KHS + KHCO_3 \quad (9)$$

$$K_2CO_3 + CO_2 + H_2O \rightarrow 2KHCO_3 \quad (10)$$

If the preliminary $CO_2$ absorption tower 13 is operated at a pH value of about 10.5, $CO_2$ can be absorbed with no substantial $H_2S$ release. $H_2S$ released slightly is burnt and returned to the cooling tower 2. All of the $K_2S$ is reduced into KHS and about one-half of the coexistent $K_2CO_3$ is reduced to $KHCO_3$. The operation temperature is set at 30° to 80° C., preferably 40° to 60° C.

The KHS solution thus obtained is then fed to a $H_2S$ release tower 14. By feeding the below-mentioned filtrate obtained after separation of $KHCO_3$ crystals in a separator 16 optionally incorporated with a part of $KHCO_3$ slurry obtained from the $CO_2$ absorption tank 15 simultaneously and externally heating them by means of steam or the like to raise the solution temperature above 80° C. and below boiling temperature, $H_2S$ gas is produced through the following reaction:

$$KHS + KHCO_3 \rightarrow K_2CO_3 + H_2S \quad (11)$$

The following side reaction also occurs partially:

$$2KHCO_3 \rightarrow K_2CO_3 + CO_2 + H_2O \quad (12)$$

The partial pressure $P_{H_2S}$ of $H_2S$ and the partial pressure $P_{CO_2}$ of $CO_2$ are represented by the following relation and $H_2S$ can be obtained in a high concentration of above 70% of $H_2S$ conc. by suitably adjusting the concentration ratio for KHS and $KHCO_3$.

$$P_{H_2S}/P_{CO_2} \propto [KHS]/[KHCO_3]$$

$H_2S$ thus obtained may be oxidized in a Claus reactor 17, as required, into sulfur (S). Air may be used as an oxidizing agent therein but a part of $SO_2$ issued upon previous thermal decomposition of $K_2S_2O_6$ maybe used. A part of the solution after releasing $H_2S$ is used for the dissolution of $K_2S$ and the remaining part of the solution is blown with $CO_2$ gas in the $CO_2$ absorption tank 15, by which $K_2CO_3$ is converted into $KHCO_3$.

$$K_2CO_3 + CO_2 + H_2O \rightarrow 2KHCO_3 \qquad (13)$$

While the $CO_2$ gas used in the above reaction can be supplied basically by the use of $CO_2$ gas generated upon the below-mentioned dissolution of $KHCO_3$ crystals in the absorbing solution, if it is insufficient, the combustion exhaust gas with $SO_x$ removed can be used. Since $KHCO_3$ has a relatively low solubility, it forms slurry in the course of $CO_2$ gas absorption. The $KHCO_3$ slurry is partially or wholly sent to the separator 16 to separate $KHCO_3$ crystals therefrom.

The filtrate from the separator 16 is fed as the $KHCO_3$ source to the $H_2S$ release tower 14 and, if it is insufficient for the required amount of $KHCO_3$, a part of the $KHCO_3$ slurry is also fed together.

A small amount of $K_2S_2O_3$ is generated as by-products in the reducing reaction of $K_2SO_4$ and, in the use of combustion exhaust gas with $SO_x$ removed for $CO_2$ gas supply, $K_2S$ is partially oxidized into $K_2S_2O_3$ by $O_2$ contained in the combustion exhaust gas, which is gradually accumulated in the solution of the $H_2S$ release step. Since $K_2S_2O_3$ has an extremely high solubility, it can not be separated with ease from the absorption solution after it has once been incorporated therein. Accordingly, the solution discharged from $H_2S$ releasing step, for example, the filtrate after separation of $KHCO_3$ in the separator 16 is partially extracted and returned to the reducing furnace 10 to decompose and reduce $K_2S_2O_3$ into $K_2S$, so that $K_2S_2O_3$ may not incorporate in $KHCO_3$ crystals as much as possible.

A portion of the separated $KHCO_3$ crystals is fed to a $NH_3$ generator 9 and the remaining portion is dissolved into the absorption solution and kept at predetermined $K^+$ concentration and pH value. It is desired to introduce $CO_2$ gas generated in this course to the $CO_2$ absorption tank 15 for use.

$$KHSO_3 + KHCO_3 \rightarrow K_2SO_3 + CO_2 + H_2O \qquad (14)$$

Through the foregoing procedures, NOx and SOx contained in the exhaust gas can be converted into ammonia and hydrogen sulfide or sulfur.

Since $K_2SO_3$ can be used at a high concentration in the absorptive solution according to this invention, the concentration of a ferrous salt in the absorptive solution can be kept high to enable the effective NOx absorption. Moreover, the absorption products can be converted into $NH_3$ and $H_2S$ or $S$ valuable in use.

EXAMPLE

STEP OF ABSORBING $NO_x$ AND $SO_x$ INTO ABSORPTION SOLUTION FOLLOWED BY SEPARATING $NH(SO_3K)_2$, $K_2S_2O_6$ AND $K_2SO_4$

To an absorption tower of $15 \times 15$ cm$^2$ in square and 8 m in height, were fed an exhaust gas of the following composition at 150 NM$^3$/hr. and an absorption solution of the following composition at 1.7 t/hr. The absorption rate of $SO_2$ is 98% and the absorption rate of NO is 81% in the period of from 5 to 100 hours.

| Gas composition: | |
|---|---|
| $SO_2$ | 2600 ppm |
| NO | 180 ppm |
| $O_2$ | 4% |
| $N_2$ | balance |
| temperature | 70° C. |

| Absorption solution composition: | |
|---|---|
| Fe-EDTA | 0.225 mol/kg |
| $K_2SO_3$ | 0.95 mol/kg |
| pH | 6.5 (adjusted by $K_2CO_3$ addition) |
| temperature | 55° C. |

(The amount of the absorption solution in the absorption system is 250 kg.)

In the course of the above gas absorption, a portion of the absorption solution was extracted at 75 kg/hr. from the tank and cooled to 35° C. Then, the crystallized potassium salt was separated and well washed with cold water. The filtrate and washing water were incorporated with $K_2CO_3$ and returned to the absorption solution tank for recycling use. The separated crystals amounted to 198 kg (dry amount) after 100 hour's operation. The crystals were a mixture of 146 kg of $K_2S_2O_6$, 23 kg of $NH(SO_3K)_2$ and 29 kg of $K_2SO_4$. The amount of EDTA in the absorption solution after 100 hours, when analyzed on back Ca titration, was found to be 0.224 mol/kg.

STEP OF HYDROLYZING $NH(SO_3K)_2$ TO GENERATE $NH_3$ GAS AND SIMULTANEOUSLY DECOMPOSING $K_2S_2O_6$ 19.8 kg of crystal mixture separated in the above-mentioned step was externally heated in a hydrolyzer under an atmospheric pressure in the presence of steam to an inside temperature of 300° C. in order to hydrolyze $NH(SO_3K)_2$ and to thermally decompose $K_2S_2O_6$. After 30 minutes, the mixture was found to be 14.9 kg of $K_2SO_4$, 0.91 kg of $NH_4HSO_4$ and 0.3 kg of $NH(SO_3K)_2$, and 1.37 NM$^3$ of $SO_2$ gas was generated during the course of the hydrolysis. The hydrolyzates thus obtained were then transferred into an ammonia generator, incorporated with 2.00 kg of $KHCO_3$ in order to neutralize the produced $NH_4HSO_4$ and externally heated to an inside temperature of 280° C. under stirring. Upon analysis for the contents 30 minutes after, a mixture containing 16.2 kg of $K_2SO_4$, 0.18 kg of $NH_4HSO_4$, 0.20 kg of $NH(SO_3K)_2$ and 0.45 kg of $K_2CO_3$ was found and 0.15 NM$^3$ of $NH_3$ gas and 0.37 NM$^3$ of $CO_2$ gas were evolved in the course of the neutralization.

STEP OF REDUCING RESIDUAL $K_2SO_4$ INTO $K_2S$

A mixture of $K_2SO_4$, $NH(SO_3K)_2$, $NH_4HSO_4$, $K_2CO_3$ and coal was continuously fed in the following amount to a reducing furnace of reflection type in order to reduce $K_2SO_4$ into $K_2S$. The furnace was directly heated by a combustion gas of high temperature generated from a kerosene burner. The coal fed as a reducing agent was contained 75% of fixed carbon and used in the pulverized form of 100 to 200μ.

| Amount of feed | |
|---|---|
| $K_2SO_4$ | 24.9 (kg/hr) |
| $NH(SO_3K)_2$ | 0.3 (kg/hr) |
| $NH_4HSO_4$ | 0.3 (kg/hr) |
| $K_2CO_3$ | 0.7 (kg/hr) |
| coal | 9.2 (kg/hr) |

The fed solids were melted into a liquid of low viscosity, while foaming, in about 10 minutes. The temperature of the solution was set to about 950° C. The resulted molten solution was flown out from the furnace and cooled to solidify under $N_2$ atmosphere. The solid thus obtained amounted to 17.6 kg/hr. and had the following composition:

| | |
|---|---|
| $K_2S$ | 77.5% by weight |
| | (water insoluble content; 3.4%) |
| $K_2CO_3$ | 13.0% by weight |
| | (water insoluble content; 3.4%) |
| $K_2SO_4$ | 2.9% by weight |
| | (water insoluble content; 3.4%) |
| $K_2S_2O_3$ | 3.2% by weight |
| | (water insoluble content; 3.4%) |
| $K_2SO_3$ | trace |

STEP OF CONVERTING $K_2S$ INTO $H_2S$

The reaction products obtained in the above-mentioned step were dissolved in an amount of 17.6 kg/h into 144 kg/h of the solution issued from a $H_2S$ release tower described hereinafter and then made into a clear solution while removing insoluble components. This solution was fed to a preliminary $CO_2$ absorption tower and an off-gas issued from a $CO_2$ absorption tank described hereinafter was introduced at the bottom of the tower. The temperature in the tower was controlled to 40° C.

As the result, a solution (pH=10.4) containing 12% by weight of KHS, 21% by weight of $KHCO_3$ and 28% by weight of $K_2CO_3$ was obtained. This solution was fed to the $H_2S$ release tower together with the feeding of 57.2 kg/h of a residual solution separated from $KHCO_3$ crystals described hereinafter (containing a little amount of $KHCO_3$ crystals). The $H_2S$ release tower had in its lower portion a reboiler to be heated by steam and the temperature of the solution was thereby kept to 105° C. As the result, $H_2S$ containing a great amount of steam and small amount of $CO_2$ was evolved. The gas was cooled to 30° C. and removed water therefrom through condensation to obtain 2.5 $NM^3/h$ of $H_2S$ containing 0.8 $NM^3/h$ of $CO_2$. 222 kg/h of solution was discharged from the $H_2S$ release tower and it was contained 13% of $KHCO_3$, 4.6% of KHS and 27% of $K_2CO_3$.

The solution thus obtained was branched into two portions, 144 kg/h of which was used for the above-mentioned dissolution of the products of the reducing reaction and 78 kg/h of the remaining portion was fed to a $CO_2$ absorption tank. 10 $NM^3/h$ of $CO_2$ gas was blown into the $CO_2$ absorption tank and vigorous stirring was effected. The temperature of the solution was controlled to a 30° C.

As the result, a slurry of $KHCO_3$ was obtained. $KHCO_3$ crystals were separated by a 28 kg/h of portion from the slurry and the residual solution was fed to the above-mentioned $H_2S$ release tower.

The off-gas containing $CO_2$ and $H_2S$, issued from the $CO_2$ absorption tank, was led to the foregoing preliminary $CO_2$ absorption tower, and $CO_2$ gas was further absorbed therein.

What is claimed is:

1. A process for converting $NO_x$ and $SO_x$ contained in exhaust gas of combustion to ammonia and sulfur comprising:

a first step of cooling said exhaust gas to a temperature lower than 100° C., a second step of absorbing said $NO_x$ and $SO_x$ in an aqueous solution at least containing an iron chelate, potassium salt and potassium sulfite, a third step of cooling said solution used in the second step and containing potassium imidodisulfonate and potassium dithionate formed by the absorbed $SO_x$ and $NO_x$, of separating the thus formed potassium salts by filtration as crystals and of recycling the filtrate to said second step, a fourth step of heating the thus formed and separated potassium salts to a temperature of 250° to 300° C. in the presence of steam to hydrolyze potassium imidodisulfonate to ammonium hydrogen sulfate and potassium sulfate and to thermally decompose simultaneously potassium dithionate into potassium sulfate and sulfur dioxide, a fifth step of admixing potassium hydrogen carbonate to the reaction residue of said fourth step at a temperature of 200° to 300° C. thereby neutralizing said reaction residue to evolve ammonia and of recovering said ammonia, a sixth step of reducing the remaining potassium sulfate by the addition of carbonaceous substance at a temperature of 900° to 1,000° C. into potassium sulfide, a seventh step of dissolving said potassium sulfide in an aqueous solution containing potassium carbonate followed by incorporating carbon dioxide thereby converting said dissolved potassium sulfide into potassium hydrogen sulfide, an eighth step of admixing an aqueous solution containing potassium hydrogen carbonate to the solution containing the thus formed potassium hydrogen sulfide thereby converting said potassium hydrogen sulfide into hydrogen sulfide and potassium carbonate, a ninth step of recovering said hydrogen sulfide, then of recycling a part of the residual solution containing said potassium carbonate into said seventh step and of incorporating carbon dioxide further into the other part of said residual solution containing potassium carbonate thereby converting said potassium carbonate into potassium hydrogen carbonate, a tenth step of recycling the resultant solution containing potassium hydrogen carbonate after separating the precipitated potassium hydrogen carbonate into said eighth step thereby converting said potassium hydrogen sulfide into hydrogen sulfide, and an eleventh step of producing sulfur by utilizing hydrogen sulfide obtained in said eighth step and sulfur dioxide obtained in said fourth step in the Claus process.

2. The process according to claim 1, wherein said iron chelate potassium salt is ferrous and ferric ethylenediamine-tetraacetate or ferrous and ferric nitrilotriacetate.

3. The process according to claim 1, wherein in said sixth step said reducing agent is a carbonaceous substance selected from the group consisting of coal, coke, petroleum pitch and petroleum coke.

* * * * *